No. 77,582.                        PATENTED MAY 5, 1868.
W. CARR.
BURGLAR TRAP.
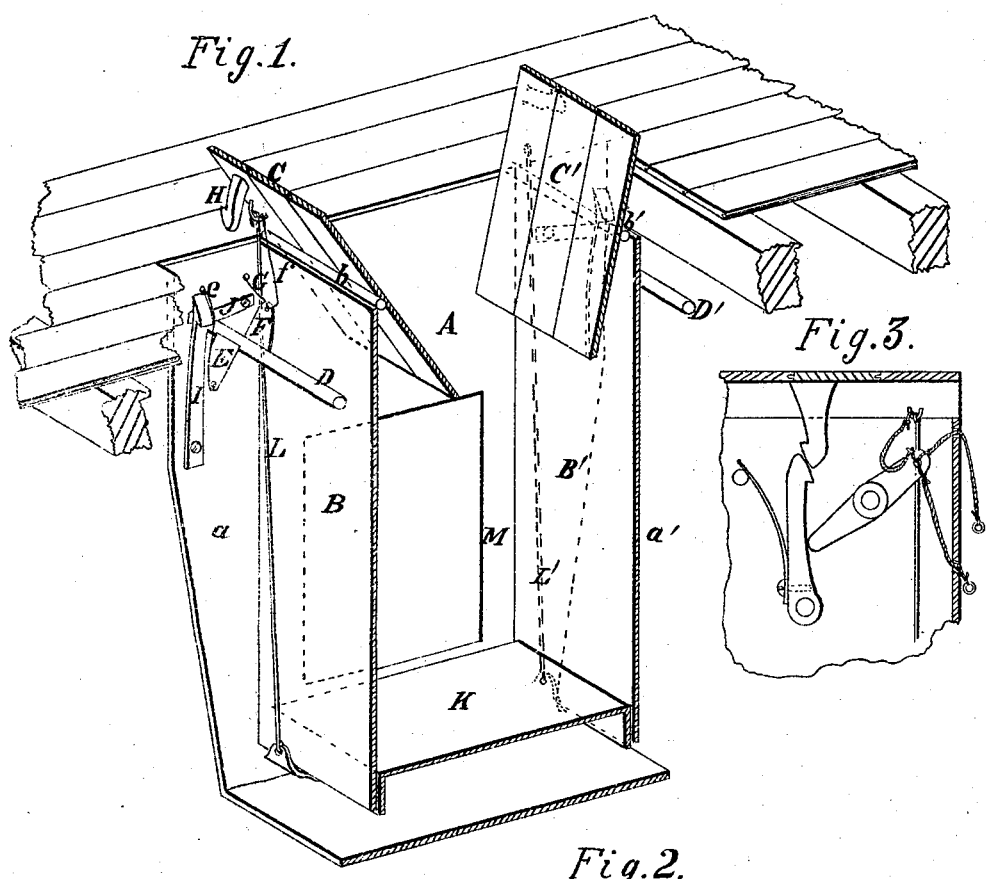
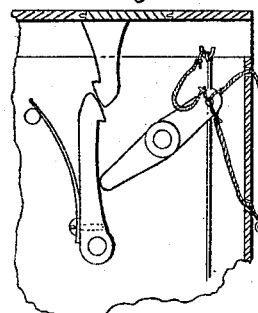
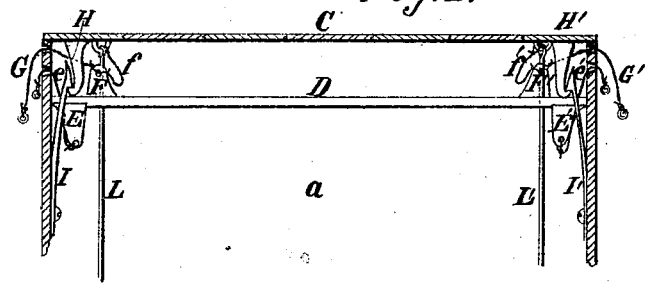
WITNESSES.                                              INVENTOR.

United States Patent Office.

WILLIAM CARR, OF YELLOW SPRINGS, OHIO.

Letters Patent No. 77,582, dated May 5, 1868.

---

IMPROVED BURGLAR-TRAP.

---

The Schedule referred to in these Letters Patent and making part of the same.

---

TO WHOM IT MAY CONCERN:

Be it known that I, WILLIAM CARR, of Yellow Springs, Greene county, and State of Ohio, have invented a certain new and useful Burglar-Trap; and do hereby declare the following to be a full, clear, and exact description thereof, reference being had to the accompanying drawings, making part of this specification.

This invention relates to a trap which is to be located in a cellar or basement under a store or office, and the apparatus is provided with doors, which are on a level with the floor of the store, the doors being arranged in such a manner as to open, the instant the burglar steps on them, and deposit him in the trap.

The apparatus is so arranged that the burglar rests upon a false bottom, which is connected to the trap-doors with rods or chains, by which means the weight of the occupant serves to keep the doors closed, and thus prevents his escape.

In the accompanying drawings—

Figure 1 is a vertical section, partially in perspective, of a burglar-trap embodying my improvement.

Figure 2 is a transverse section, taken through the upper part of the trap.

Figure 3 represents a modification of the device for operating the trap-doors.

The principal part of the trap consists of a chamber, A, which is placed beneath the ground-floor of a store, &c.; and this chamber is divided in three parts by means of the vertical partitions B B', the central part, A, of the chamber being for the retention of the burglar, while the other two, $a\ a'$, contain the devices for operating the doors.

Hinged, at $b\ b'$, to the upper ends of the partitions B B' are the trap-doors C C', which are on a level with the floor of the store; and these doors are operated by the following devices:

Placed athwart the two side-chambers $a\ a'$ are rock-shafts D D', having attached to them inclined planes, E E' and arms F F', the latter being connected to the trap-doors by the cords $f f'$ G G' and $e\ e'$ are cords or other flexible connection, which are attached respectively to the arms F F' and inclined planes E E'; and these cords communicate with the outside of the trap, for purposes which will be hereafter described.

The under sides of the doors C C' have attached to them catches H H', which engage under other catches, I I', that are secured to the sides of the chambers $a\ a'$; and said catches I I' are maintained in their effective position by means of springs J J'.

K is a platform, which is suspended from the trap-doors C C' by the rods L L', by which arrangement any weight thrown upon the platform will close them M is a door, fastened on the outside of the step, and which, when opened, will permit the liberation of the captive.

The trap is set in the following manner:

The cords $e\ e'$ are first pulled from the outside of the trap, in such a manner as to cause a partial rotation of the rock-shaft D D', by which means the inclined planes E E' disengage the catches I I' from the ones H H', which leaves the trap-doors free to turn on their bearings as soon as a person treads upon them.

Should a burglar now enter a room in which the trap is located, and step upon either or both of the doors C C', they will instantly open, and deposit him upon the platform K, which will be depressed a sufficient distance to close said doors.

When these doors are thus opened, the cords $f f'$ cause the rock-shafts D D' to rotate in such a manner as to elevate the arms F F', and depress the inclined planes E E', by which means the catches H H' and I I' are in the proper condition to engage with each other.

As soon as the descent of the platform K has caused the closing of the trap-doors, the catches H H' and I I' engage with one another, and thereby securely lock said doors, so as to prevent them being opened by any person who may be in the chamber A.

It will be seen that the catches H H' and I I act, in connection with the weight of the person upon the platform, in retaining the doors in their closed condition, and, even in case the prisoner should succeed in scaling the walls of the chamber, the locking-devices H H' and I I' will effectually prevent him forcing open the trap-doors.

The trap can be set so as to prevent its operating in daytime, by simply pulling the cords G G', which will rotate the shafts D D', so as to permit of the catches H H' and I I' engaging with each other.

In the modification of my invention, shown in fig. 3, only one catch is applied to each trap-door, and the rock-shaft, which operates the catch on the inside of the apparatus, is placed at right angles to the one shown in figs. 1 and 2.

I claim herein as new, and of my invention—

1. A burglar-trap, consisting of the chamber A, trap-door or doors C C', rods L L', and suspended platform K, the whole being arranged to operate substantially as herein described and set forth.

2. I claim the combination and arrangement, substantially as described, of the chambers A, $a$ $a'$, partitions B B', trap-doors C C', platform K, and rods L L', together with the shafts D D', and their accessories, E E', $e$ $e'$, F F', $f f'$, G G', H H', I I', and J J', for the object explained.

In testimony of which invention, I hereunto set my hand.

WILLIAM CARR.

Witnesses:
  GEO. H. KNIGHT,
  JAMES H. LAYMAN.